United States Patent

Barnes et al.

[11] Patent Number: 5,603,524
[45] Date of Patent: Feb. 18, 1997

[54] RELEASABLE FASTENER FOR AIR BAG DEPLOYMENT COVER

[75] Inventors: William J. Barnes, Waterford; Joseph L. Grabowski, Shelby Township, Macomb County, both of Mich.

[73] Assignee: General Motors Corporation, Detroit, Mich.

[21] Appl. No.: 566,288

[22] Filed: Dec. 1, 1995

[51] Int. Cl.$^6$ .................................................. B60R 21/16
[52] U.S. Cl. ..................................... 280/728.2; 280/728.3
[58] Field of Search ............................. 280/728.2, 728.3, 280/731, 732

[56] References Cited

U.S. PATENT DOCUMENTS

| | | | |
|---|---|---|---|
| 3,308,708 | 3/1967 | Holton | 85/32 |
| 4,508,477 | 4/1985 | Oehike et al. | 411/174 |
| 4,714,392 | 12/1987 | Muller et al. | 411/175 |
| 4,842,299 | 6/1989 | Okamura et al. | 280/732 |
| 4,925,209 | 5/1990 | Sakurai | 280/743.1 |
| 5,211,421 | 5/1993 | Catron et al. | 280/728.2 |
| 5,217,253 | 6/1993 | Pray | 280/732 |
| 5,217,254 | 6/1993 | Satoh | 280/732 |
| 5,256,018 | 10/1993 | Rattmann et al. | 411/175 |
| 5,366,240 | 11/1994 | Hanabusa et al. | 280/728.2 |
| 5,398,961 | 3/1995 | Rogers et al. | 280/728.3 |
| 5,407,224 | 4/1995 | Bauer et al. | 280/728.2 |

FOREIGN PATENT DOCUMENTS 1-81154  5/1989  Japan.

*Primary Examiner*—Kenneth R. Rice
*Attorney, Agent, or Firm*—Charles E. Leahy

[57] ABSTRACT

According to the invention, the vehicle panel has an opening through which an air bag inflates, and a over panel for closing the opening. The cover panel is mounted for movement away from the vehicle panel to permit inflation of the air bag through the opening. A fastener clip is mounted on one of the panels and has an integrally formed extruded boss therethrough which defines a tubular boss extending on an axis normal to the direction of opening movement of the cover panel. The other panel, preferably of molded plastic, has a pair of opposing flex fingers which reach part way around the and grip the outer surface of the tubular boss to thereby retain the fastener clip to the one panel. A screw is installed through the other panel and through the tubular boss to thereby secure the cover panel on the vehicle panel. The flex fingers flex away from one another to release from the outer surface upon opening movement of the cover panel.

6 Claims, 4 Drawing Sheets

RELEASABLE FASTENER FOR AIR BAG DEPLOYMENT COVER

The invention relates to an improvement in vehicle air bags and, more particularly, provides an improved releasable fastener which holds an air bag cover panel in a closed position and is releasable to permit opening of the cover panel upon air bag deployment.

BACKGROUND OF THE INVENTION

It is well known in motor vehicles to provide an inflatable air bag which deploys into the occupant compartment to cushion the occupant. Such air bag systems are known to include a driver air bag mounted on a steering wheel, a passenger air bag mounted on the instrument panel forwardly of the passenger seating position, and also supplemental air bags which may be mounted elsewhere on the vehicle structure such as on a seat, door, or roof.

In such air bag installations, it is known to mount an air bag module beneath the surface of a vehicle panel and provide an air bag deployment opening in the vehicle panel through which the air bag may inflate. The deployment opening is conventionally closed by a cover panel which is normally held in the closed position and opens in response to air bag deployment. The cover panel conceals the air bag module from view.

The cover panel is conventionally a relatively small panel which is arranged to fit flush within an opening provided in a larger vehicle panel, such as the instrument panel, door panel, or other panel. Alternatively, the cover panel may extend the full dimension of the vehicle panel, such as the instrument panel cover of U.S. Pat. No. 5,333,901 by William J. Barnes.

It would be desirable to provide a new and improved releasable fastener for facilitating assembly of the vehicle, normally retaining the air bag cover panel in the closed position, and releasing the cover panel for opening movement upon inflation of the air bag.

SUMMARY OF THE INVENTION

According to the invention, the vehicle panel has an opening through which an air bag inflates, and a cover panel for closing the opening. The cover panel is mounted for movement away from the vehicle panel to permit inflation of the air bag through the opening. A fastener clip is mounted on one of the panels and has an integrally formed extruded boss therethrough which defines a tubular boss extending on an axis normal to the direction of opening movement of the cover panel. The other panel, preferably of molded plastic, has a pair of opposing flex fingers which reach part way around and grip the outer surface of the tubular boss to thereby retain the fastener clip to the one panel. A screw is installed through the other panel and through the tubular boss to thereby secure the cover panel on the vehicle panel. The flex fingers flex away from one another to release from the outer surface upon opening movement of the cover panel.

BRIEF DESCRIPTION OF THE DRAWINGS

These and other objects, features and advantages of the invention will become apparent upon consideration of the preferred description of the embodiment and the appended drawings in which.

DESCRIPTION OF THE PREFERRED EMBODIMENT

Figure 1:
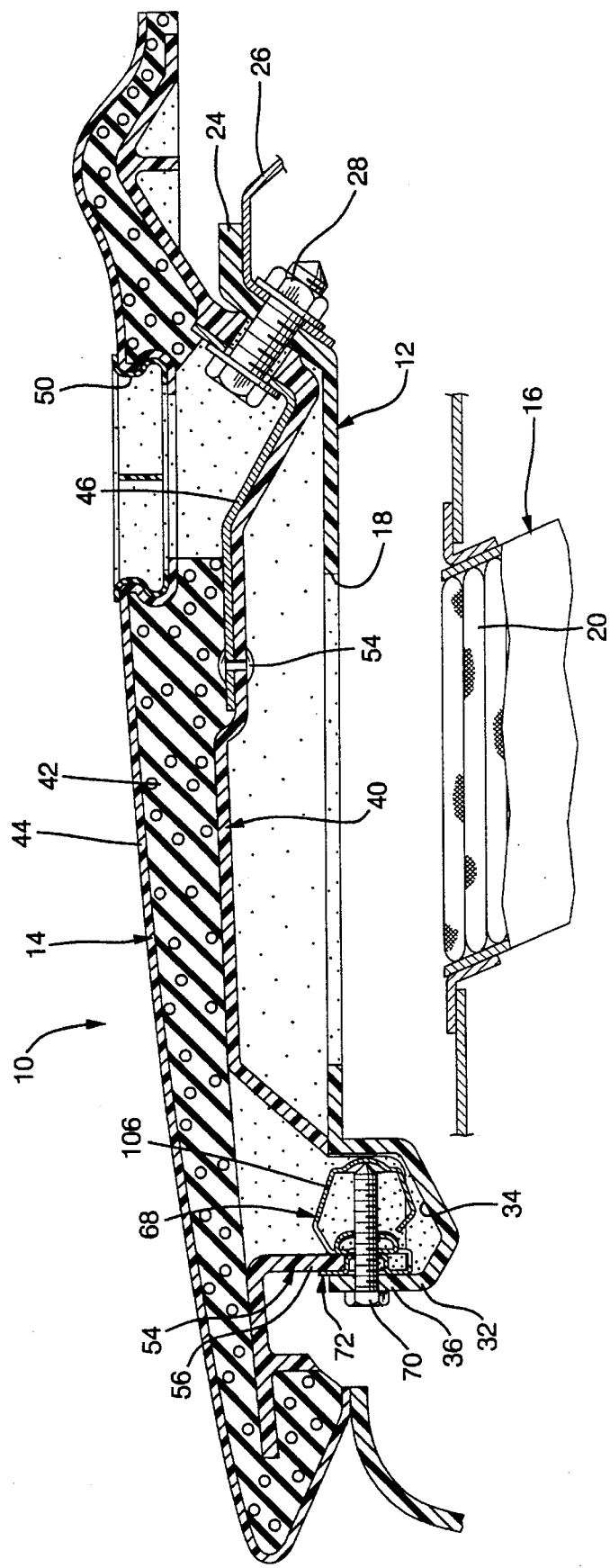
FIG. 1 is a section view through an instrument panel structure having an air bag cover panel connected to the vehicle panel by a releasable fastener arrangement according to the present invention.

Referring to FIG. 1, a motor vehicle body has an instrument panel structure 10 which is comprised generally of a support panel 12 suitably attached to the vehicle body, and an instrument panel cover assembly 14 which overlies the support panel 12. An air bag module, generally indicated at 16, is suitably mounted on the vehicle body beneath the vehicle support panel 12. The support panel 12 has a deployment opening 18 therein which registers with the air bag module 16 to permit inflation of an air bag 20 into the occupant. The instrument panel cover assembly 14 serves as a closure panel which ordinarily conceals the air bag module 16 from view and may be forcibly pivoted upward to permit deployment of the inflating air bag 20 into the occupant compartment.

As best seen in FIG. 1, the support panel 12 is of molded plastic construction and extends crosswise across the vehicle instrument panel. The leading edge 24 of the support panel 12 is attached to a vehicle panel 26 by a plurality of bolts, one of which is shown at 28. The rearward edge 32 of the support panel 12 has a trough 34 which defines a vertical upstanding wall 36. The support panel 12 is suitably attached to the vehicle structure of the vehicle body by suitable fasteners, not shown.

The instrument panel cover assembly 14 includes a molded plastic lower retainer panel 40, a layer of foam padding 42, a vinyl sheet cover 44 and a reinforcing hinge bracket 46. In addition, the instrument panel cover assembly 14 carries a defroster outlet grille 50 which communicates air to the vehicle windshield.

As seen in FIG. 1, the reinforcing hinge bracket 46 is attached to the lower retainer panel 40 by a plurality of rivets, one of which is shown at 54. The reinforcing hinge bracket 46 has holes which receive the bolts 28 so that the instrument panel cover 14 is thereby attached to the vehicle panel 26.

Figure 2:
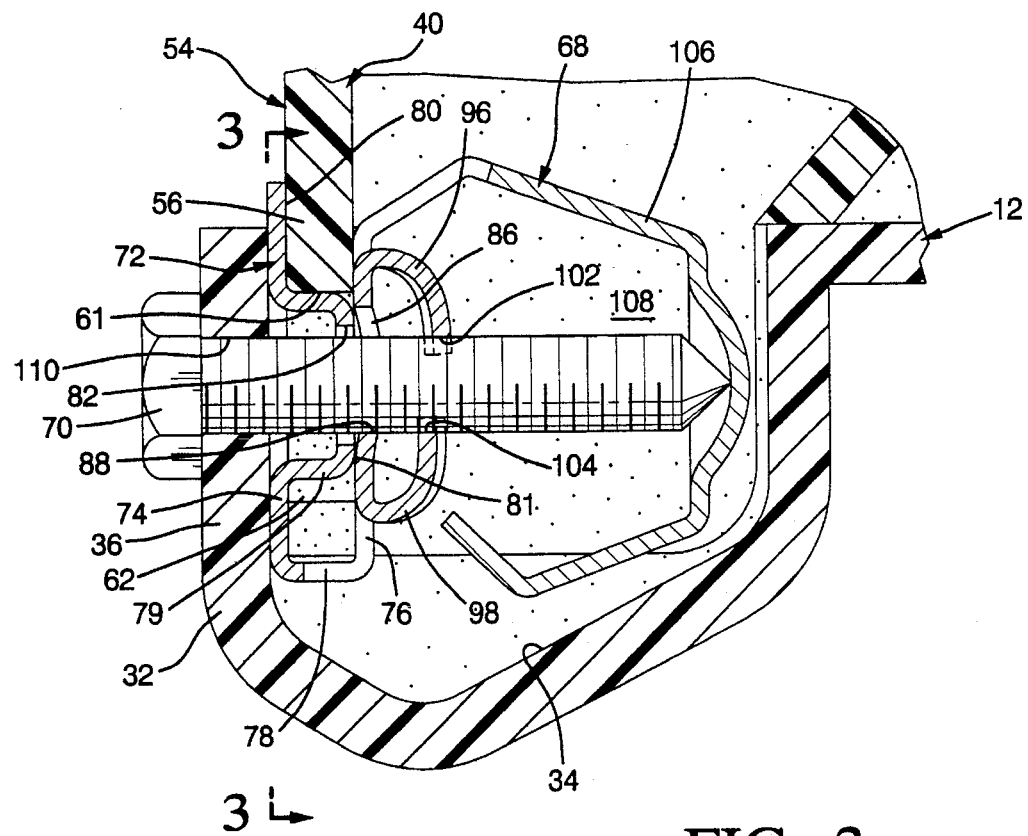
FIG. 2 is an enlarged fragmentary view of a portion of FIG. 1 showing the releasable fastener arrangement.
Figure 3:
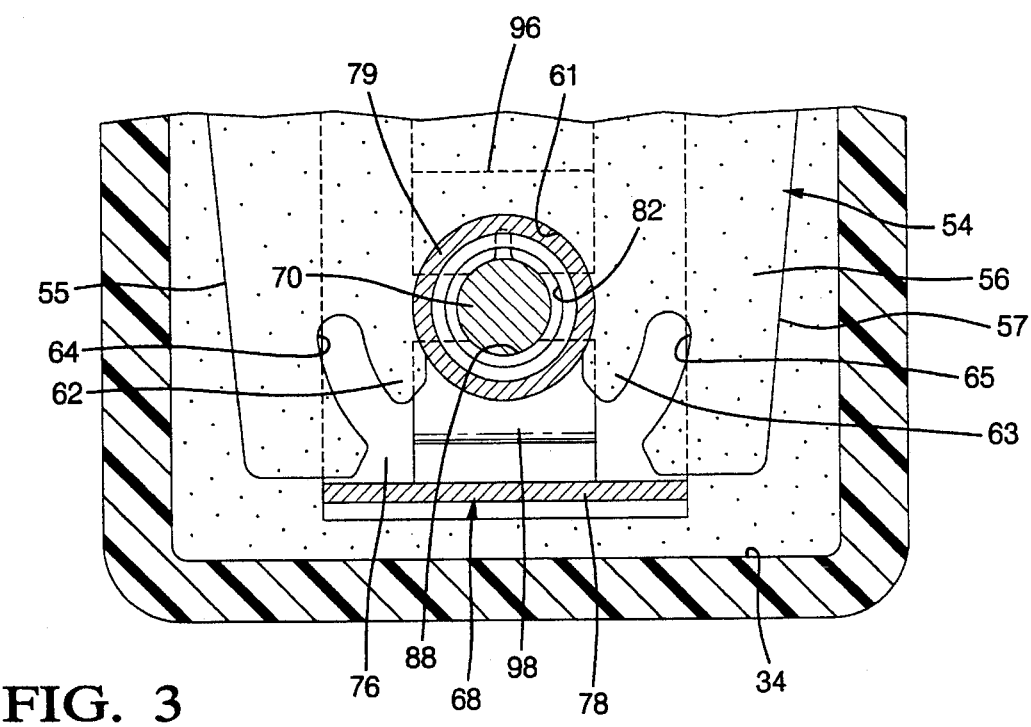
FIG. 3 is a section view taken in the direction of arrows 3—3 of FIG. 2.
Figure 5:
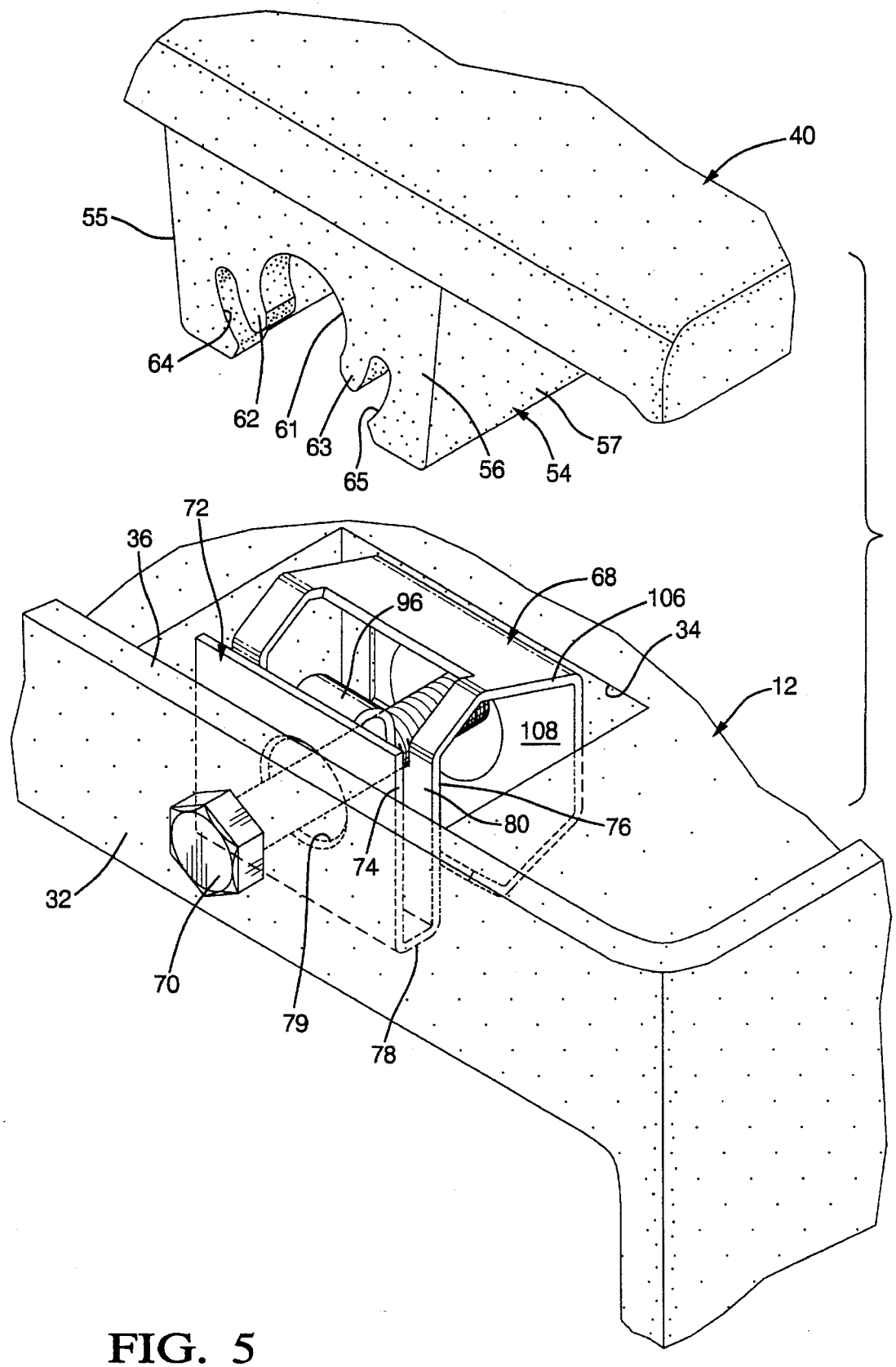
FIG. 5 shows the air bag cover having been released from the vehicle panel by the releasable fastener arrangement.

As best seen in FIGS. 2 and 5, the trailing edge of the retainer panel 40 includes a plurality of downwardly depending abutment structures, one of which is shown at 54. The abutment structure 54 includes a depending wall 56 which projects downwardly from the retainer panel 40 and a pair of side brace walls 55 and 57 which cooperate to strengthen and stiffen the depending wall 56 so that the abutment structure 54 is dimensionally and structurally stable. As best seen in FIGS. 1 and 2, the abutment structure 54 reaches downwardly into the trough 34 of the vehicle support panel 12 so that the depending wall 56 is juxtaposed with the upstanding wall 36 of support panel 12. As seen in FIGS. 3 and 5, the depending wall 56 has an open end circular slot 61 defined in part by flex fingers 62 and 63 which are spaced from the side brace walls 55 and 57 by relief slots 64 and 65.

The abutment structure 54 of the instrument cover panel assembly 14 is releasably connected to the vehicle support panel 12 by a releasable fastening arrangement which includes the flex fingers 62 and 63 of the abutment structure 54, a fastener clip assembly generally indicated at 68, and a screw 70.

As best seen in FIGS. 2 and 5, the fastener clip assembly 68 includes a U-shaped base portion 72 comprised of spaced apart parallel legs 74 and 76 connected by closed end 78 and extending to open end space 80. Leg 74 includes an extruded tubular boss 79 which extends toward the second leg 76 and has an end face 81 having a clearance hole 82 therethrough for freely receiving the threaded screw. The second leg 76 has a slight frusto-conical projection 86 having a screw hole 88 therethrough provided by a helical edge.

A pair of arms 96 and 98 are lanced from the second leg 76 and bent toward each other to define spaced apart free edges 102 and 104 adapted to be threadedly engaged by the screw 70, as will be discussed hereafter.

As best seen in FIGS. 2 and 5, the second leg 76 has an integral hood structure 106 formed therewith. The hood structure 106 is of generally "c" shaped configuration and defines a shielded cavity 108. By virtue of the general "c" shape, it is seen that the hood structure 106 reaches around the end of the threaded screw 70 and returns into close proximity of the second leg 76 adjacent the closed end 78 thereof.

Figure 4:
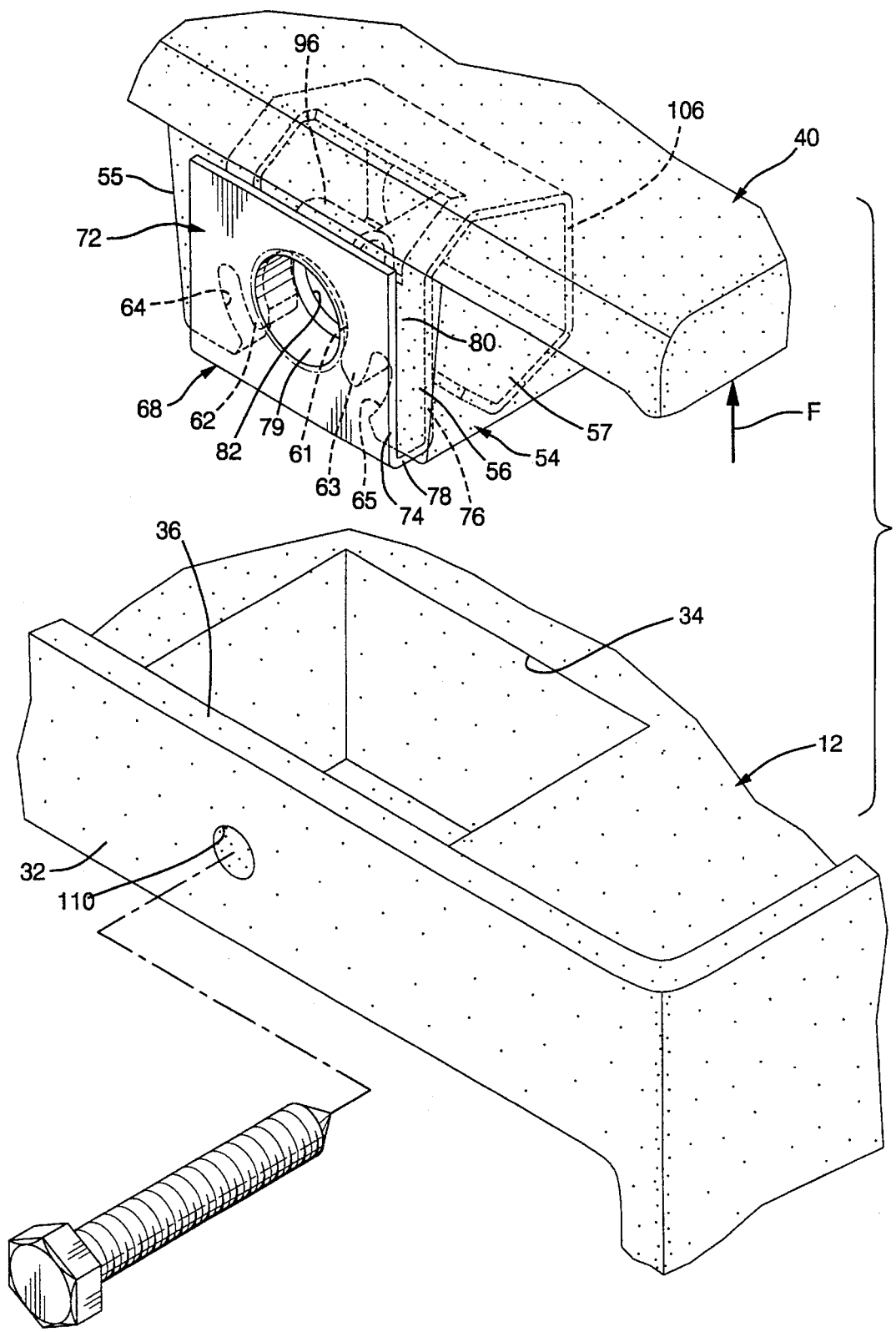
FIG. 4 shows a metallic fastener clip attached to the air bag cover prior to attachment to the vehicle panel.

FIG. 4 shows the fastener clip assembly 68 installed in place on the cover assembly 14. The fastener clip 68 is clipped onto the cover assembly 14 by aligning the open end space 80 of the fastener clip 68 with the open end slot 61 and the clip 68 is pushed into place with the depending wall 56 inserted between legs 74 and 76 and the extruded boss seated within the open end slot 61. The extruded boss 79 is of a diameter which closely corresponds with the diameter of the open end slot 61 and the flex fingers yieldably grip the extruded boss 79 as shown in FIG. 3.

The cover assembly 14 is lowered from the position of FIG. 4 to the position of FIGS. 1 and 2 in which the abutment structure 54 fits into the trough 34 of the support panel 12, thereby aligning a screw hole 110 provided in the upstanding wall 36 of support panel 12 with fastener clip 68. The screw 70 is installed through the screw hole 110 of support panel 12 through the clearance hole 82 of leg 74, and rotated to become threadedly engaged with the helical edge 88 of the frusto-conical projections 86 of second leg 76 and then with the free ends 102 and 104 of the arms 96 and 98. Upon continued rotation and complete tightening of the screw 70, the second leg 76 is drawn into engagement with the abutment end face 81 of the extruded boss 79 to thereby stop further movement of the legs toward one another and control the force with which the legs 74 and 76 grip onto the depending wall 56 of the cover assembly 14. With the screw 70 fully installed, as shown in FIG. 2, it is seen that the excess length portion of the threaded screw 70 is received within the cavity 108 where it is shielded by the hood structure 106.

It will be understood that the length of the extruded boss 79 is selected to establish the desired predetermined spacing between the legs, and accordingly, the length of the extruded boss can be chosen to provide the desired level of frictional clamping of the legs against the depending wall.

As seen in FIG. 5, a release force will be applied to the panel member 40 in the direction of arrow "F" and will attempt to remove the depending wall 56 of the cover assembly 14 from between the legs 74 and 76. If the release force attains a level which exceeds the frictional grip of the legs against the depending wall, and furthermore, is sufficient to cause a flexure of flex fingers 62 and 63, the cover assembly 14 will pivot upwardly and become released from the fastener clip 68 to enable deployment of the air bag into the occupant compartment.

Thus, it is seen that the invention provides a new and improved fastener arrangement particularly suited for releasably connecting together a pair of panels. Although the drawings and description of the preferred embodiment demonstrate the invention in the environment of a deployable instrument panel cover similar to that of prior patent, Barnes U.S. Pat. No. 5,333,901, it will be understood that the invention is equally applicable in other air bag deployment door environments, such as an instrument panel installation where the air bag deployment door is situated within an opening provided in the instrument panel cover. Furthermore, although the foregoing description has the fastener clip assembly 68 clipped onto the cover panel, it will be understood that the fastener clip assembly 68 may be clipped onto the vehicle panel.

We claim:

1. In combination:

a vehicle panel having an opening through which an air bag inflates;

a cover panel for closing the opening and mounted for movement away from the vehicle panel to permit inflation of the air bag through the opening;

a fastener clip adapted for mounting on one of the panels and having an intergrally formed extruded boss therethrough defining an outer surface of a tubular boss which extends on an axis generally parallel with the panel and normal to the direction of opening movement of the cover panel; and the other panel having a pair of opposing flex fingers which reach part way around the tubular boss and grip the outer surface of the tubular boss to retain the cover panel in the normal closed position, and said flex fingers flexing away from one another to release from the outer surface of the tubular boss upon opening movement of the cover panel.

2. The combination of claim 1 further characterized by the tubular boss of the fastener clip defining a cavity through which a screw is installed to attach the clip to the one panel.

3. The combination of claim 1 further characterized by the clip including a pair of spaced apart legs defining an open end space therebetween and the other panel including a depending wall projecting normally therefrom and into the recess.

4. The combination of claim 3 further characterized by one of the legs having the tubular boss of the fastener clip extruded therein and defining a cavity through which a screw is installed to attach the clip to the one panel, and the other leg has a thread carried thereby to threadedly receive the screw so that tightening of the screw progressively grips the depending wall between the legs.

5. The combination of claim 4 further characterized by the other leg having a hood portion integral therewith to enclose the screw.

6. The combination of claim 4 further characterized by the tubular boss terminating at an end face and having a predetermined length so that tightening of the screw causes the other leg to engage against the end face to thereby control the force with which the legs grip the depending wall.

\* \* \* \* \*